Dec. 28, 1954   J. E. PIERCE   2,697,885
EDUCATIONAL DEVICE
Filed Dec. 3, 1951   2 Sheets-Sheet 1
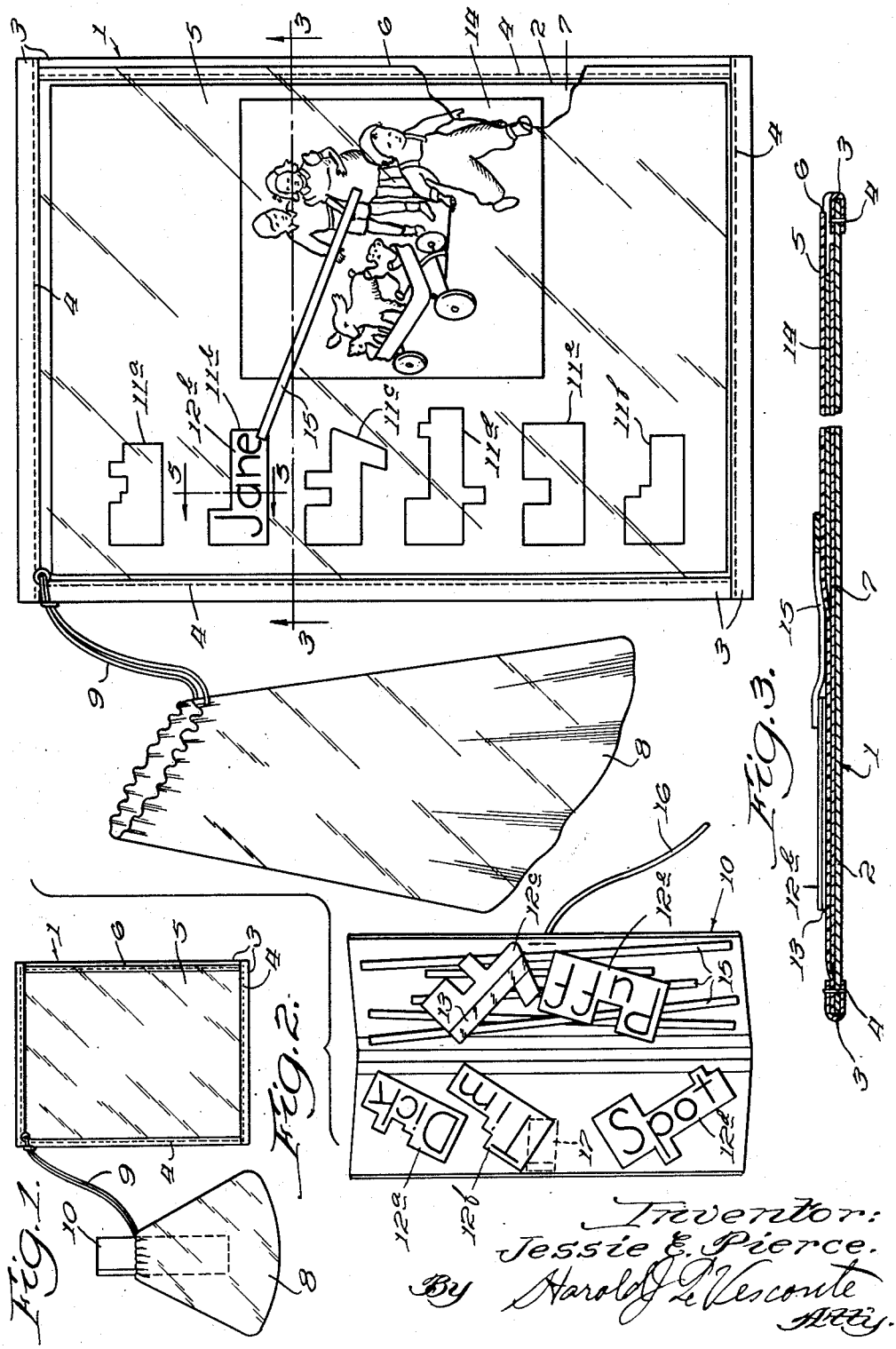
Inventor:
Jessie E. Pierce.
By Harold L. Vesconte
Atty.

Dec. 28, 1954  J. E. PIERCE  2,697,885
EDUCATIONAL DEVICE
Filed Dec. 3, 1951  2 Sheets-Sheet 2
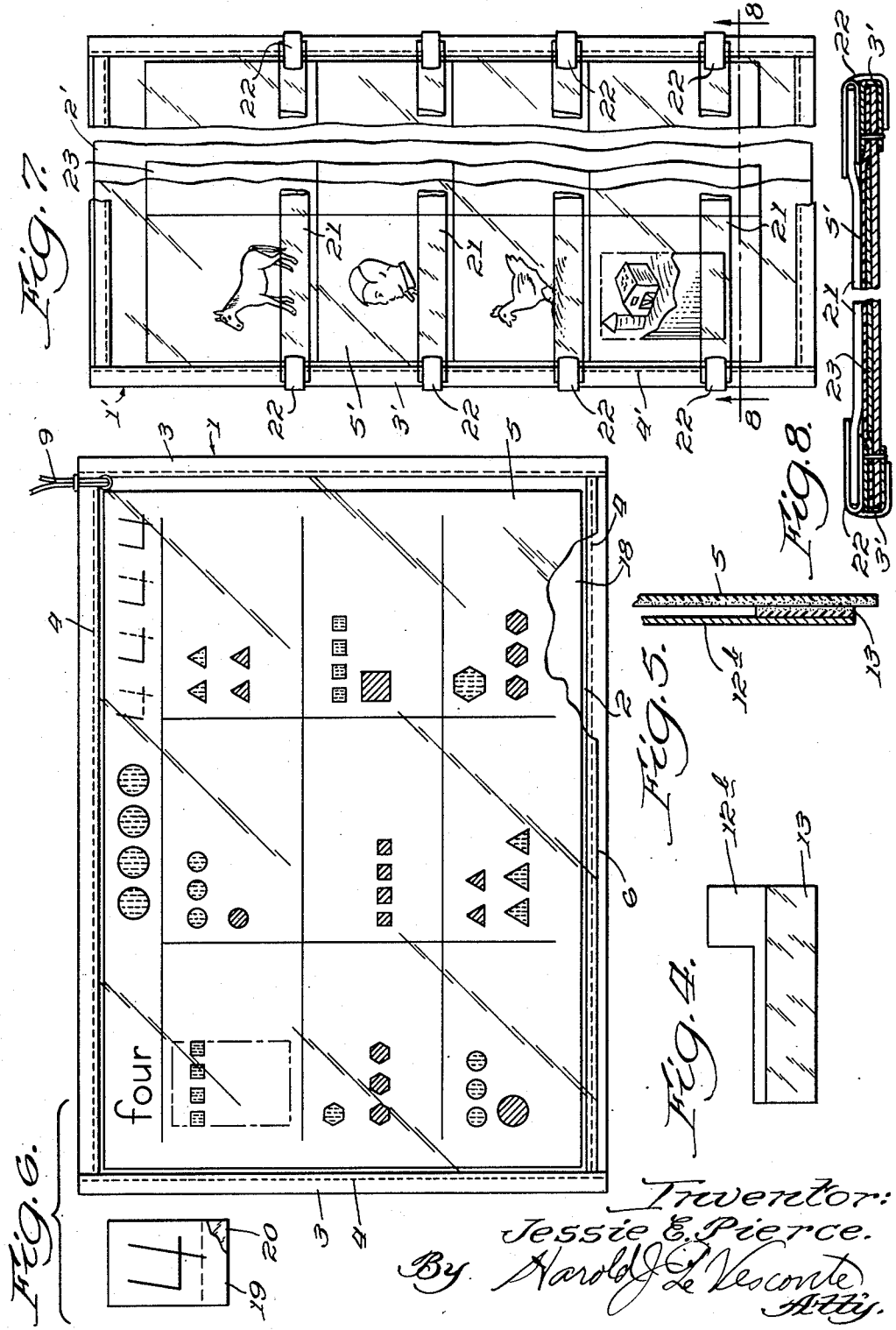
Inventor:
Jessie E. Pierce.
By Harold J. L. Vesconte
Atty.

United States Patent Office
2,697,885
Patented Dec. 28, 1954

2,697,885

EDUCATIONAL DEVICE

Jessie E. Pierce, Burbank, Calif.

Application December 3, 1951, Serial No. 259,596

2 Claims. (Cl. 35—73)

This invention relates to educational devices and particularly to a game type of device by means of which a child may be taught and may be assisted in teaching himself associations of ideas such as word forms with objects, word forms with words, objects with words, similarities and differences between objects, numbers with words and word forms, numerals with numbers, word forms and words, and many other associations of ideas in the process of kindergarten and primary learning.

The principal object of the invention is to provide a device for use as a teaching aid for use by a child which can be employed for teaching a wide variety of associations of ideas or concepts, which has the appeal of a game for the child using it, which is simple and economical to manufacture, and which is of light weight to permit ready use by small children.

With the foregoing objects in view, together with such other objects and advantages as may subsequently appear, the invention resides in the parts, and in the construction, combination, and arrangement of parts, disclosed by way of example, in the following specification of certain embodiments of the invention, reference being had to the accompanying drawings which form a part of said specification and in which drawings:

Fig. 1 is a plan view of an educational device embodying a representative mode of execution of the invention, Fig. 2 is an enlarged, exploded view of the device shown in Fig. 1 with certain of the loose parts positioned to illustrate one use of the device, Fig. 3 is a transverse, sectional view taken on the line 3—3 of Fig. 2, Fig. 4 is an enlarged plan view of the rear face of one of the word indicating pieces used in the form of the device shown in Fig. 2, Fig. 5 is an enlarged, fragmentary, sectional view taken on the line 5—5 of Fig. 2, Fig. 6 is an exploded plan view of the device shown in Fig. 2, but with a different lesson sheet inserted therein and with a corresponding change in the loose pieces to be used therewith, Fig. 7 is a fragmentary, plan view of a second embodiment of the invention including shiftable, detachable pocket members for the blanking out elements in lieu of the self-adhering means employed in the first described embodiment of the invention, and Fig. 8 is a sectional view taken on the line 8—8 of Fig. 7.

Referring first to Figs. 1 to 5, inclusive, of the drawings, the illustrated embodiment of the invention includes a board component 1 comprising a rectangular body member 2 of rigid sheet material having a binding 3 covering all edges thereof and secured to the body member by any suitable means as, for example by stitching 4. Mounted on one face of the body member is a sheet of thin transparent plastic material 5 which is secured along three sides of the body member 2 by being inserted beneath the binding 3 for penetration by the stitching 4. The remaining side 6 of the sheet 5 terminates adjacent to the edge of the binding and is not attached to the body member with resultant formation of an envelope-like space between the sheet and body member for reception of interchangeable lesson sheets of which one is shown at 7. Attached to one corner of the board component is a bag 8 closed by a drawstring 9, the ends of which are attached to the board component 1 to serve also as the connecting means. Contained in the bag is the material in the form of loose pieces to be used with the lesson sheet 7 here comprising a folder 10 comprising a pair of rigid leaf elements hinged together along one side thereof and enclosing the material now to be described.

The lesson sheet illustrated carries a series of outlines of word forms indicated at 11a, 11b, 11c, 11d, 11e and 11f and the folder contains blanks 12a, 12b, 12c, 12d, 12e and 12f of corresponding outline having words corresponding to those outlines printed on one side thereof. By selection, the child places each blank over the corresponding outline on the lesson sheet on the outer surface of the plastic sheet 5. The plastic sheet 5 is of a character having a slightly adhesive character when contacted with the same type of material and the back of each word blank has a strip of the same material 13 affixed thereto so that upon light pressure the word blanks will be fixed in position on the outer surface of the sheet 5 until forcibly removed thus permitting considerable handling of the board without shifting of the word blanks placed thereon.

By practice of this association of the words and their outlines, the child learns to recognize the words and to associate the word with a particular form or outline. Additionally, the lesson sheet may include a picture 14 as shown and the picture may either be fixed to the lesson sheet or be separate to enable different pictures to be used with a given lesson sheet. The picture includes objects familiar to the child and to which at least some of the words apply. To enable the child to show his understanding of the idea of associating a given word with an object in the picture a set of pointers 15 of the same type of plastic material is included in the folder 10; the pointers preferably being colored rather than transparent, and by applying these pointers to connect the words with related objects in the picture, the child demonstrates his understanding of a given word with one of the objects in the picture. By way of illustration in Fig. 2, the blank space 11b which conforms to the shape of the word blank 12b carrying the word "Jane" is covered by the word blank 12b and one of the pointers 15 is used to connect that word with one of the figures in the picture. The remaining words will be similarly positioned and connected by pointers.

By the use of a different picture having similar objects in a different arrangement with a given lesson sheet, the child is enabled to understand that a given word may apply to other objects as well. Further the same picture may be used with a different lesson sheet to enable the child to establish classifications and groupings; such lesson sheet having for example the words "boy," "girl," "toy," "pet," etc. When the lesson is complete, the loose pieces are placed in the folder 10 and the leaves thereof fastened together by any suitable means within the skill of a small child to manipulate such as the tie string 16 fixed to one free edge of the folder leaf and the clip 17 on the opposite leaf about which the string may be wrapped. The folder is then replaced in the bag 8 and the device is ready for use by the next child or for exchange of the material for other use.

Referring next to Fig. 6, the same type of board component is shown but with a lesson sheet 18 designed to promote an association of ideas relative to the word "four," the numeral "4," and the meanings thereof. As here shown, the lesson sheet carries at the top thereof the word "four," next four colored circles to indicate four units, and finally the steps of printing the numeral "4." The remainder of the sheet is ruled off into rectangular areas each containing groups of four or five geometrical figures and the folder for the lesson sheet includes a series of rectangular blanks 19 each having an attaching strip 20 on the rear face thereof and some of the blanks having the numeral "4" and other having the word "four" on the front face thereof to be placed over the appropriate rectangular areas by the child to indicate his understanding of the meaning of the word and numeral and the selection of those indications in which the correct number occurs of the same elements or of a mixture of different elements as the teaching process advances. Later, the same lesson sheet with different blank elements may be used in teaching simple addition and subtraction problems to impart concepts of these ideas to the child and other blanks can be employed to further impart the classification and grouping concepts by selecting those areas having similar or different figures or colors, etc. Similar sheets would of course be employed for the other numerals.

Referring finally to Figs. 7 and 8, there is shown a modified form of the invention in which the board component 1' is formed in the same manner as the board component 1 in the preceding figures except that the opening for the insertion of lesson sheets is at the end rather than at the side to illustrate the point that this opening may be at the side or end in either form of the invention. The modification consists in the provision of blank holding means consisting of plastic strips 21 bent on themselves lengthwise thereof and provided with hook-like clip elements 22 at each end to snugly engage the opposite side edges of the board component with the folded plastic strip serving for a receiving pocket for appropriate blanking elements to be inserted therein to cover portions of the lesson sheet 23 inserted under the transparent sheet 5'. In the illustrated form the lesson sheet is ruled off into rectangular areas, each having a picture of some animal plant, person or object, and the pictures are so arranged that in each row of pictures one of the pictures is unlike the others in some respect. In the example shown, three of the pictures relate to living objects and one is a building, and of the animate objects, one is a child and the other two are animals. In the use of a lesson sheet of this character, the child learns to identify and classify certain objects and indicates his learning by covering the picture that is unlike the others by placing a blank over the unlike picture by inserting the end of the blank in the pocket formed by the strip 21. This form of the invention is obviously equally well adapted for use with lesson sheets such as shown in Fig. 6; it being understood that if desired the strip elements would be formed to engage the opposite ends of the board component instead of extending crosswise thereof as may be best suited for a particular lesson sheet regardless of whether the opening is on the end or side thereof and that each board component would have attached thereto a bag to hold the loose pieces for use with the particular lesson sheet to be used therewith.

Also it will be appreciated that while the contemplated size of the above described device would be such as to be easily handled by a small child, it may be made in larger sizes for classroom demonstrations to a group before the group is given the smaller sized boards for personal use. The teaching possibilities are not limited to standard lesson sheets, but such sheets may be supplemented by others designed by the teacher to accommodate special situations.

The device is simple in construction and may be economically manufactured. It combines the learning processes with the interest of a game in which each child can race against others in his class and achieve the satisfaction of demonstrating the extent of his learning. The possibilities of use are many and varied whereby interest may be maintained without loss of attention. Additionally it provides a means whereby the learning process may be extended in to the free time or play periods of the class.

While the foregoing specification describes and illustrates certain modes of execution of the invention, it is to be understood that the invention is not limited to the exact embodiments so disclosed and that the invention includes as well all such modifications in the parts and in the construction, combination and arrangement of parts as shall come within the purview of the appended claims.

I claim:

1. In an educational device, the combination of a rectangular board element having a transparent plastic sheet disposed at one side thereof and connected to said board element along three sides thereof with resultant formation of an envelope-like compartment having a transparent side for reception of a sheet of lesson material to be viewed through said transparent sheet, a plurality of loose pieces applicable exteriorly of said transparent sheet to indicate proposed solutions of problems presented by the lesson sheet, and means exteriorly of said transparent sheet effective to detachably locate and secure said loose pieces in position on the exterior of said transparent sheet to indicate the proposed solution of a lesson sheet problem; said locating and securing means for said loose pieces comprising means detachably mounted on said combined board element and transparent sheet effective to partially determine the location of said loose pieces on the exterior of said transparent sheet incident to the solution of a lesson sheet problem.

2. An educational device as claimed in claim 1 in which the means for partially locating the loose pieces on the exterior surface of said transparent sheet comprises a flexible strip folded on itself to provide a receiving pocket for edge portions of said loose pieces, and a pair of hook elements fixed one to each end of said strip and engaging the opposite side edges of said combined board element and transparent sheet with said folded strip closely overlying said transparent sheet.

References Cited in the file of this patent

UNITED STATES PATENTS

| Number | Name | Date |
|---|---|---|
| 364,845 | Oakley | June 14, 1887 |
| 706,463 | Smith | Aug. 5, 1902 |
| 1,273,763 | Garman | July 23, 1918 |
| 1,421,975 | Meyers | July 4, 1922 |
| 1,701,557 | Clinch et al. | Feb. 12, 1929 |
| 1,799,287 | Stevens et al. | Jan. 27, 1931 |
| 2,585,924 | Freedman et al. | Feb. 19, 1952 |

FOREIGN PATENTS

| Number | Country | Date |
|---|---|---|
| 821,703 | France | Aug. 30, 1937 |